US012723721B1

(12) United States Patent
Li

(10) Patent No.: US 12,723,721 B1
(45) Date of Patent: Sep. 1, 2026

(54) COLD LIGHT SOURCE LIGHT-EMISSION APPARATUS, LIGHT-EMISSION ADJUSTMENT METHOD, AND OUTDOOR LIGHT-EMISSION DEVICE

(71) Applicant: Wenjie Li, Guangzhou (CN)

(72) Inventor: Wenjie Li, Guangzhou (CN)

( * ) Notice: Subject to any disclaimer, the term of this patent is extended or adjusted under 35 U.S.C. 154(b) by 0 days.

(21) Appl. No.: 19/265,034

(22) Filed: Jul. 10, 2025

(30) Foreign Application Priority Data

Apr. 23, 2025 (CN) ........................ 202510516886.3

(51) Int. Cl.

| | |
|---|---|
| ***F21K 9/64*** | (2016.01) |
| ***F21V 9/32*** | (2018.01) |
| ***F21V 23/04*** | (2006.01) |
| *F21Y 113/00* | (2016.01) |
| *F21Y 115/10* | (2016.01) |

(52) U.S. Cl.
CPC .................. *F21K 9/64* (2016.08); *F21V 9/32* (2018.02); *F21V 23/0464* (2013.01); *F21Y 2113/00* (2013.01); *F21Y 2115/10* (2016.08)

(58) Field of Classification Search
CPC ........... F21K 9/64; F21V 9/32; F21V 23/0464
See application file for complete search history.

(56) References Cited

U.S. PATENT DOCUMENTS 6,183,102 B1 2/2001 Mortz et al.
11,916,177 B2 * 2/2024 Eom .................. H10H 20/8515
12,087,889 B1 * 9/2024 Baretz .................... C09K 11/55
2006/0012972 A1 1/2006 Sturley
2006/0105480 A1 * 5/2006 Boardman ........... H10H 20/852 257/E33.059
2007/0004065 A1 * 1/2007 Schardt .............. H10H 20/8515 438/22
2010/0321921 A1 12/2010 Ivey
2014/0022759 A1 1/2014 Li (Continued)

FOREIGN PATENT DOCUMENTS

CN 101358696 A 2/2009
CN 219163425 U 6/2023

(Continued)

OTHER PUBLICATIONS

Extended Search Report issued on Jan. 2, 2026, in corresponding European Application No. 25188631.3, 12 pages.

*Primary Examiner* — Christopher E Dunay
(74) *Attorney, Agent, or Firm* — Maier & Maier, PLLC

(57) ABSTRACT

A cold light source light-emission apparatus, a light-emission adjustment method, and an outdoor light-emission device. The cold light source light-emission apparatus includes a fluorescent component and an LED module, the fluorescent component includes a transparent body and a fluorescent layer, an interior of the transparent body is an accommodation cavity, the fluorescent layer is arranged inside the accommodation cavity, an interior of the fluorescent layer is arranged with fluorescent powder, a light-emission direction of the LED module is set towards the fluorescent component, when the LED module emits light towards the fluorescent component, the fluorescent powder absorbs the light for energy storage, and when the fluorescent powder absorbs sufficient light for energy storage, the fluorescent powder reaches an excited state and emits light.

10 Claims, 3 Drawing Sheets

(56) References Cited

U.S. PATENT DOCUMENTS

| | | | | |
|---|---|---|---|---|
| 2015/0241003 | A1 | 8/2015 | Ikami | |
| 2016/0254422 | A1 | 9/2016 | Zhao et al. | |
| 2017/0045201 | A1 * | 2/2017 | Jones | F21K 9/64 |
| 2022/0173079 | A1 * | 6/2022 | Pan | H10W 90/00 |

FOREIGN PATENT DOCUMENTS

| | | | |
|---|---|---|---|
| CN | 119087722 | A | 12/2024 |
| FR | 3107335 | A1 | 8/2021 |
| WO | 2021079758 | A1 | 4/2021 |

* cited by examiner

COLD LIGHT SOURCE LIGHT-EMISSION APPARATUS, LIGHT-EMISSION ADJUSTMENT METHOD, AND OUTDOOR LIGHT-EMISSION DEVICE

CROSS-REFERENCE TO RELATED APPLICATIONS

The present application claims priority to Chinese Patent Application No. 202510516886.3, filed on Apr. 23, 2025, the content of all of which is incorporated herein by reference.

FIELD

The present disclosure relates to the technical field of outdoor devices, in particular to a cold light source light-emission apparatus, a light-emission adjustment method, and an outdoor light-emission device.

BACKGROUND

In current outdoor activities, due to a relatively dim outdoor environment, it is difficult for users to quickly find outdoor devices that need to be used in the dim environment. Some manufacturers have started to provide a corresponding cold light source apparatus on various types of outdoor products (such as headlights, flashlights, cutting tools, etc.). The cold light source apparatus has a certain self-light-emission function, with characteristics of low heat generation, stable light-emission performance, and long service life, making it easy for users to quickly locate a required item in the dim environment. Currently, the cold light source apparatus on the market is generally implemented by coating with radium luminescent coating or by using a tritium gas tube. However, both the radium luminescent coating and the tritium gas tube have certain radiation and are prone to affecting the human body. Moreover, the apparatus is generally coated with the radium luminescent coating relying on natural light as an energy source. When the natural light is not strong leading to insufficient natural-light absorption, the apparatus cannot stably emit light and is easily affected by weather, thereby limiting outdoor usage scenarios of the apparatus.

Therefore, the cold light source apparatus in the prior art has the problems of easily affecting the human body, being greatly affected by weather, and being limited in usage scenarios.

SUMMARY

In view of the above-mentioned defects of the prior art, the present disclosure provides a cold light source light-emission apparatus, a light-emission adjustment method, and an outdoor light-emission device to solve the problems of easily affecting the human body, being greatly affected by weather, and being limited in usage scenarios of the cold light source apparatus in the prior art.

The technical schemes of the present disclosure are as follows.

A cold light source light-emission apparatus arranged at an outdoor light-emission device is disclosed, including:

- a fluorescent component, including a transparent body and a fluorescent layer, where an interior of the transparent body is an accommodation cavity, the fluorescent layer is arranged inside the accommodation cavity, and an interior of the fluorescent layer is arranged with fluorescent powder; and,

- an LED module, where a light-emission direction of the LED module is set towards the fluorescent component;
- where, when the LED module emits light towards the fluorescent component, the fluorescent powder absorbs the light for energy storage, and when the fluorescent powder absorbs sufficient light for energy storage, the fluorescent powder reaches an excited state and emits light.

In some embodiments, the LED module includes a plurality of LED chips including a UV chip.

In some embodiments, a surface of the fluorescent layer is arranged with a plurality of protrusions, and cross-sectional widths of the plurality of protrusions decrease along a direction deviating from the fluorescent layer.

In some embodiments, a plurality of transparent protrusions are arranged between the transparent body and a bottom of the fluorescent layer, and fluorescent powder is arranged between adjacent transparent protrusions.

In some embodiments, a filter is arranged between the LED module and the fluorescent component, and a bottom of the LED module is arranged with a base.

In some embodiments, the cold light source light-emission apparatus further includes an optical sensor and a controller both electrically connected to each other, the optical sensor is arranged at the outdoor light-emission device, and the controller is electrically connected to the LED module;

- where when the optical sensor senses environment brightness and then sends a signal, the controller receives the signal to obtain data of the environment brightness;
- when the environment brightness is lower than a second brightness range, the controller adjusts the LED module to intermittently emit light to store energy for the fluorescent component; and,
- when the environment brightness is within the second brightness range, the controller adjusts the LED module to turn off.

A light-emission adjustment method adopting the cold light source light-emission apparatus described above is disclosed, including the following steps:

- collecting data of current environment brightness through the optical sensor, and sending the data to the controller for analysis and processing;
- presetting a first brightness range, the second brightness range, and a limited brightness time period in the controller, where a highest value of the second brightness range is not higher than a highest value of the first brightness range;
- when the environment brightness is lower than a lowest value of the first brightness range, using the controller to determine whether the environment brightness is within the second brightness range; and,
- when the environment brightness is lower than a lowest value of the second brightness range, using the controller to controlling the LED module to emit light intermittently based on a trigger signal from the optical sensor, so as to store energy for the fluorescent component.

In some embodiments, the step of using the controller to determine whether the environment brightness is within the second brightness range comprises the following steps:

- when the environment brightness is within the second brightness range, using the controller to start a timing module and continuously determine brightness during the limited brightness time period; and,
- when the environment brightness remains within the second brightness range during the entire limited brightness time period, using the controller to receive a hold signal from the optical sensor and control the LED module to turn off.

An outdoor light-emission device is disclosed, including an outdoor device body and the cold light source light-emission apparatus described above, where the cold light source light-emission apparatus is arranged at the outdoor device body.

In some embodiments, the cold light source light-emission apparatus is arranged inside the outdoor device body, and the outdoor device body is arranged with a slot corresponding to the fluorescent component.

Compared with the prior art, the present disclosure provides a cold light source light-emission apparatus, a light-emission adjustment method, and an outdoor light-emission device. The cold light source light-emission apparatus includes a fluorescent component and an LED module. When natural light is sufficient, fluorescent powder can directly absorb the natural light for energy storage, and then the fluorescent powder can be excited to emit light, making the apparatus suitable for use at night. When the natural light is insufficient, the fluorescent component cannot absorb enough natural light, but the LED module can be turned on to emit light on the fluorescent component, thereby helping the fluorescent powder in the fluorescent component to store energy. Moreover, a fluorescent layer is arranged inside an accommodation cavity of a transparent body, which can protect the fluorescent layer from external damage and ensure uniform light emission. The light emitted by the fluorescent powder has no impact on human health, and the cold light source light-emission apparatus of the present disclosure can charge the fluorescent component through the LED module when the natural light is insufficient, thereby exciting the fluorescent powder to emit light, so that the fluorescent powder can store enough energy and emit light even in cloudy and insufficient-light weather conditions, having wide application scenarios.

DETAILED DESCRIPTION OF THE EMBODIMENTS

Figure 1:
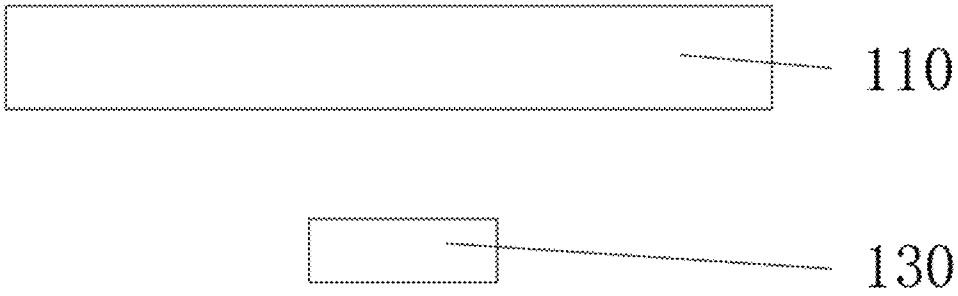
FIG. 1 is a schematic diagram of a disassembly structure of a cold light source light-emission apparatus provided in an embodiment in the present disclosure.

The embodiments of the present disclosure are described in detail below and are shown in the accompanying drawings. Identical or similar reference numerals from beginning to end represent identical or similar components or components with identical or similar functions. The embodiments described below with reference to the accompanying drawings are exemplary and are only used to illustrate the present disclosure, and should not be understood as limiting the present disclosure.

In the description of the present disclosure, it should be understood that the terms "center", "longitudinal", "transverse", "up", "down", "front", "rear", "left", "right", "vertical", "horizontal", "top", "bottom", "inside", "outside" and other directional or positional relationships indicated are based on the directional or positional relationships shown in the accompanying drawings, only for the convenience of simplifying the description of the present disclosure, and do not indicate or imply that the apparatus or component referred to must have a specific orientation and be constructed and operated in a specific orientation, and therefore cannot be understood as a limitation of the present disclosure.

In addition, the terms "first" and "second" are only used for descriptive purposes and cannot be understood as indicating or implying relative importance or the number of technical features. Thus, the features limited to "first" and "second" may explicitly or implicitly include one or more of these features. In the description of the present disclosure, unless otherwise specified, "multiple" and "plurality" refer to two or more.

The terms "parallel", "perpendicular", etc. do not imply that the components are required to be absolutely parallel or perpendicular, but can be slightly tilted. "Parallel" only refers that its direction is parallel compared to "perpendicular", and does not necessarily refer that the components must be completely parallel, but can be slightly tilted.

The terms "horizontal", "vertical", "hanging", etc. do not imply that the components are required to be absolutely horizontal, vertical, or hanging, but can be slightly tilted. "Horizontal" only refers that its direction is more horizontal relative to "vertical", and does not necessarily refer that the components must be completely horizontal, but can be slightly tilted.

In the description of the present disclosure, it should be noted that unless otherwise specified and limited, the terms "arrange", "set", "install", and "connect" should be broadly understood. For example, it can be a fixed connection, a detachable connection, or an integral connection. It can be a direct connection or an indirect connection through an intermediate component. For those ordinary skilled in the art, the specific meanings of the above terms in the present disclosure can be understood in specific situations.

Figure 2:
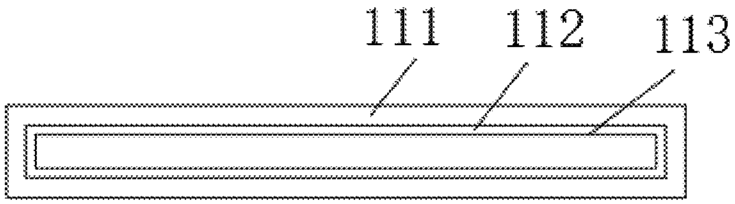
FIG. 2 is a side sectional view of a fluorescent component of the cold light source light-emission apparatus provided in an embodiment in the present disclosure.

Referring to FIG. 1 and FIG. 2, a first embodiment of the present disclosure provides a cold light source light-emission apparatus 100, which is arranged at an outdoor light-emission device. The cold light source light-emission apparatus 100 includes a fluorescent component 110 and an LED module 130. The fluorescent component 110 includes a transparent body 111 and a fluorescent layer 113. An interior of the transparent body 111 is an accommodation cavity 112, and the fluorescent layer 113 is arranged inside the accommodation cavity 112. An interior of the fluorescent layer 113 is arranged with fluorescent powder. A light-emission direction of the LED module 130 is set towards the fluorescent component 110. When the LED module 130 emits light towards the fluorescent component 110, the fluorescent powder absorbs light for energy storage. When the fluorescent powder absorbs sufficient light for energy storage, the fluorescent powder reaches an excited state and emits light.

The fluorescent powder in the fluorescent component 110 reaches the excited state after absorbing sufficient light for energy storage, and can continuously and stably emit light, making it suitable for use in outdoor conditions with insufficient light. The emitted light is soft and has a good light-emission effect. The fluorescent powder is dispersed, with good heat-dissipation ability, which can lower temperature and is easy to use. When natural light is insufficient to supplement energy of the fluorescent powder, the LED module 130 can be used to charge the fluorescent powder. The light-emission direction of the LED module 130 is set towards the fluorescent component 110, which can ensure that when the LED module 130 emits light, the emitted light directly shines on the fluorescent component 110, thereby allowing the fluorescent powder inside the fluorescent component 110 to absorb the light for energy storage.

By setting the fluorescent layer 113, the fluorescent powder can be uniformly distributed in the accommodation cavity 112 of the transparent body 111, while the transparent body 111 can encapsulate the fluorescent powder with the fluorescent layer 113, thereby preventing the fluorescent powder from being affected by an external environment and improving the light-emission effect and brightness of the fluorescent powder. The fluorescent powder inside the fluorescent layer 113 is uniformly distributed. In addition, the fluorescent powder may also be arranged on a surface of the fluorescent layer 113.

The cold light source light-emission apparatus 100 in this embodiment includes the fluorescent component 110 and the LED module 130. When there is natural light, the fluorescent powder can directly absorb the natural light for energy storage, and then the fluorescent powder can be excited to emit light, making it suitable for use at night. When the natural light is insufficient, the fluorescent component 110 cannot absorb enough natural light, but the LED module 130 can be turned on to emit light on the fluorescent component 110, thereby helping the fluorescent powder in the fluorescent component 110 to store energy. Moreover, the fluorescent layer 113 is arranged inside the accommodation cavity of the transparent body 111, which can protect the fluorescent layer 113 from external damage and ensure uniform light emission. The light emitted by the fluorescent powder has no impact on human health, and the cold light source light-emission apparatus 100 of the present disclosure can charge the fluorescent component 110 through the LED module 130 when the natural light is insufficient, thereby exciting the fluorescent powder to emit light, so that the fluorescent powder can store enough energy and emit light even in cloudy and insufficient-light weather conditions, having wide application scenarios.

The cold light source light-emission apparatus 100 of this embodiment can be applied to various situations, especially suitable for outdoor situations. In outdoor situations, the fluorescent powder in the fluorescent component 110 can absorb visible light for energy storage and light emission. At the same time, when the absorbed visible light is insufficient, the fluorescent powder can absorb intermittent light emitted by the LED module 130 and then emit light after energy storage. The cold light source light-emission apparatus 100 can be arranged at an outdoor device, making the outdoor device an outdoor light-emission device. In an insufficient-light situation, it can quickly locate the outdoor light-emission device through the light emitted by the fluorescent powder. The fluorescent powder has no impact on human health, improving the use safety of users.

In some embodiments, the cold light source light-emission apparatus 100 further includes an optical sensor 150 and a controller both electrically connected to each other. The optical sensor 150 is arranged at the outdoor light-emission device, and the controller is electrically connected to the LED module 130. When the optical sensor 150 senses environment brightness and sends a signal, the controller receives the signal to obtain data of the environment brightness. When the environment brightness is lower than a second brightness range, the controller adjusts the LED module 130 to intermittently emit light and store energy for the fluorescent component 110. When the environment brightness is within the second brightness range, the controller adjusts the LED module 130 to turn off. The controller can simultaneously control the turn-on and turn-off of the LED module 130. The controller can be arranged at the outdoor light-emission device. When the environment brightness is lower than the second brightness range, i.e., when user's environment visibility is lower than the second brightness range, the optical sensor 150 sends the signal, and the controller receives the signal and controls the LED module 130 to intermittently emit light, so as to store energy for the fluorescent component 110.

When the environment brightness is within the second brightness range, the LED module 130 is turned off; at this point, the brightness of the fluorescent component 110 or the brightness of the natural light is sufficient to meet user's requirements, thus turning off the LED module 130 can save the energy of the LED module 130 and facilitate subsequently using the LED module 130 as a backup energy source for the fluorescent component 110, thereby improving the service life of the cold light source light-emission apparatus 100 in outdoor use and enhancing the outdoor survival rate of users.

When stronger light-emission effect is required for road lighting, the fluorescent powder may be a combination of yellow fluorescent powder and a small amount of green fluorescent powder with a mass ratio of (5-10):1. A particle size of the fluorescent powder is 15-25 μm. The yellow fluorescent powder is fluorescent powder encapsulated with aluminum oxide or silicon oxide, while an LED chip of the LED module 130 is a blue-light chip.

When environment temperature is high and the apparatus needs to have high stability and long service life, the fluorescent powder may be a combination of yellow fluorescent powder and infrared fluorescent powder with a mass ratio of (3-10):1. A particle size of the fluorescent powder is 25-30 μm. The yellow fluorescent powder is encapsulated with aluminum oxide or silicon oxide, while an LED chip of the LED module 130 is an ultraviolet (UV) chip (i.e., a purple-light chip).

When rescue and warning are required, the fluorescent powder is red fluorescent powder with a particle size of 5-10 μm, while an LED chip of the LED module 130 is the UV chip.

When concealment (such as outdoor security) is required, the fluorescent powder is near-infrared fluorescent powder with a particle size lower than 50 nm, while an LED chip of the LED module 130 is an infrared-light chip.

When environment humidity is high, the fluorescent powder is a combination of the yellow fluorescent powder, the green fluorescent powder, and the red fluorescent powder, with a mass ratio of (1-4):(1-4):1. The yellow fluorescent powder is encapsulated with aluminum oxide or silicon oxide, with a particle size of 5-15 μm, while an LED chip of the LED module 130 is a blue-light chip.

A thickness of the fluorescent powder can be set according to actual needs, may be 10-100 μm, which ensures uniform distribution of the fluorescent powder while preventing heat concentration caused by excessive stacking during illumination, thereby extending the service life of the cold light source light-emission apparatus 100.

In some embodiments, the LED module 130 includes multiple LED chips, such as the UV chip.

Usage conditions, stability, and service life of the cold light source light-emission apparatus 100 in high-temperature weather are given priority consideration. The fluorescent powder is charged through the UV chip, and the fluorescent powder is the red fluorescent powder or a combination of the yellow fluorescent powder and the infrared fluorescent powder, so as to have strong brightness in outdoor use and have a strong reminder effect. The LED chips may be all UV chips, or a combination of multiple chips including the UV chip according to actual needs.

Figure 3:
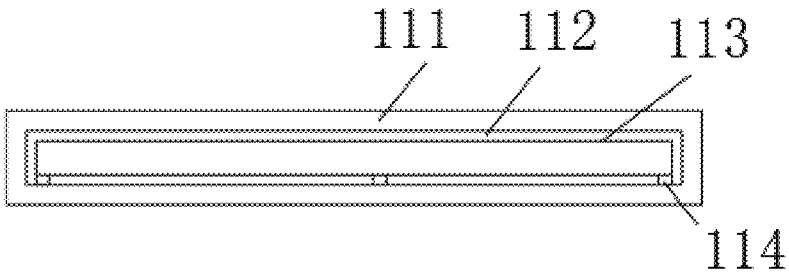
FIG. 3 is a side sectional view of a fluorescent component of the cold light source light-emission apparatus provided in another embodiment in the present disclosure.

Referring to FIG. 3, in some embodiments, the surface of the fluorescent layer 113 is provided with a plurality of protrusions, and a cross-sectional width of a protrusion decreases along a direction deviating from the fluorescent layer 113. By providing the plurality of protrusions, it is possible to prevent accumulation of the fluorescent powder, ensure the uniform distribution of the fluorescent powder, and prevent movement of the fluorescent powder, thereby improving light emission effect and stability.

The fluorescent component 110 may be a groove structure with one lower center and two higher ends, so that the light emitted by the fluorescent powder can be concentrated in a direction of a central axis of the fluorescent component 110, thereby increasing light-emission intensity and providing better reminder effect.

In some embodiments, a plurality of transparent protrusions 114 are arranged between the transparent body 111 and a bottom of the fluorescent layer 113. The fluorescent powder is arranged between adjacent transparent protrusions 114.

By setting the fluorescent layer 113 at a center position of the transparent body 111 through the transparent protrusion 114, it is convenient to emit all the light emitted by the fluorescent powder from the center position, thereby improving light-emission effect and light-emission intensity. In addition, the fluorescent powder is arranged between the transparent protrusions 114, so that the fluorescent powder is uniformly arranged in the accommodation cavity 112 of the transparent body 111.

A heat-dissipation sheet or heat-dissipation powder both for dissipating heat of the fluorescent powder can further be arranged between the adjacent transparent protrusions 114. When the fluorescent powder enters the excited state to emit light, its temperature gradually rises with extension of use time. The setting of the heat-dissipation sheet or the heat-dissipation powder can reduce temperature of the fluorescent powder and an overall temperature inside the accommodation cavity 112, thereby extending service life of the fluorescent powder. The surface of the fluorescent layer 113 can be arranged with a heat-dissipation sheet to further improve heat-dissipation effect.

A quantity of the transparent protrusions 114 can be set according to actual needs. For example, the number of the transparent protrusions 114 needs to be set on a premise of meeting the uniform distribution of the fluorescent powder.

Figure 4:
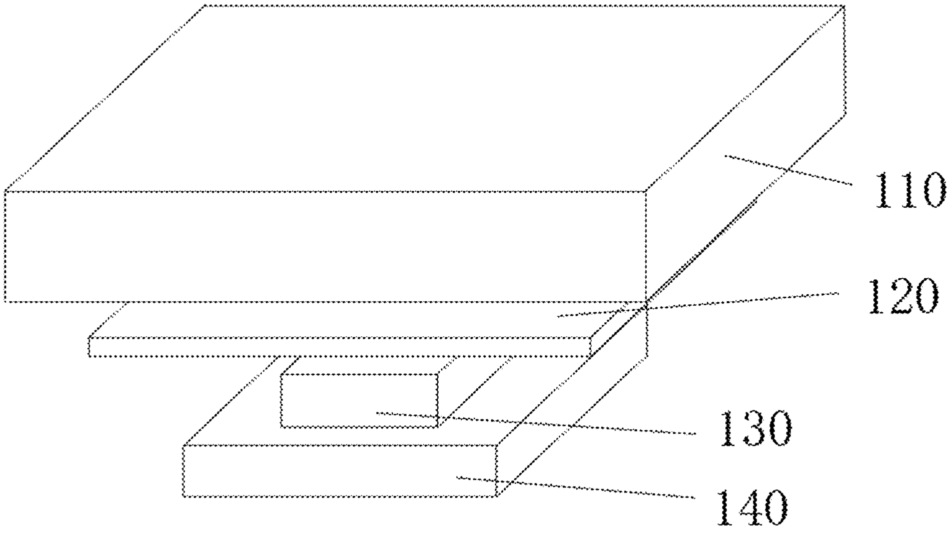
FIG. 4 is a schematic diagram of a disassembly structure of the cold light source light-emission apparatus provided in another embodiment in the present disclosure.
Figure 5:
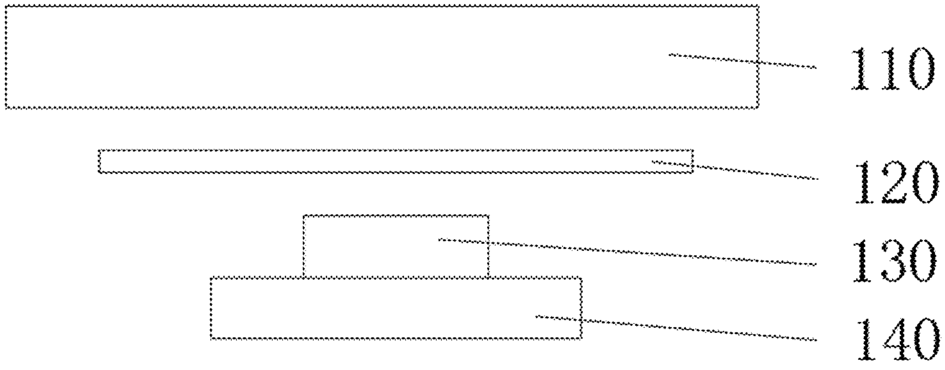
FIG. 5 is a front view of FIG. 4.

Referring to FIG. 4 and FIG. 5, in some embodiments, a filter 120 is arranged between the LED module 130 and the fluorescent component 110. A bottom of the LED module 130 is arranged with a base 140.

The filter 120 is configured to prevent light leakage during intermittent light emission of the LED module 130 so as to charge the fluorescent powder, and to improve utilization rate of the light absorbed by the fluorescent powder from the LED module 130. When the cold light source light-emission apparatus 100 is applied to a device that requires high concealment, light leakage of the LED module 130 causes user's position to be exposed, making it impossible to meet concealment requirements. The setting of the filter 120 can reduce or effectively prevent occurrence of light leakage. The base 140 is configured to fix the LED module 130, and the cold light source light-emission apparatus 100 can be stably connected to the outdoor light-emission device through the base 140, so that a position of the outdoor light-emission device can be quickly located through the cold light source light-emission apparatus 100 in low-visibility outdoor situations.

Figure 6:
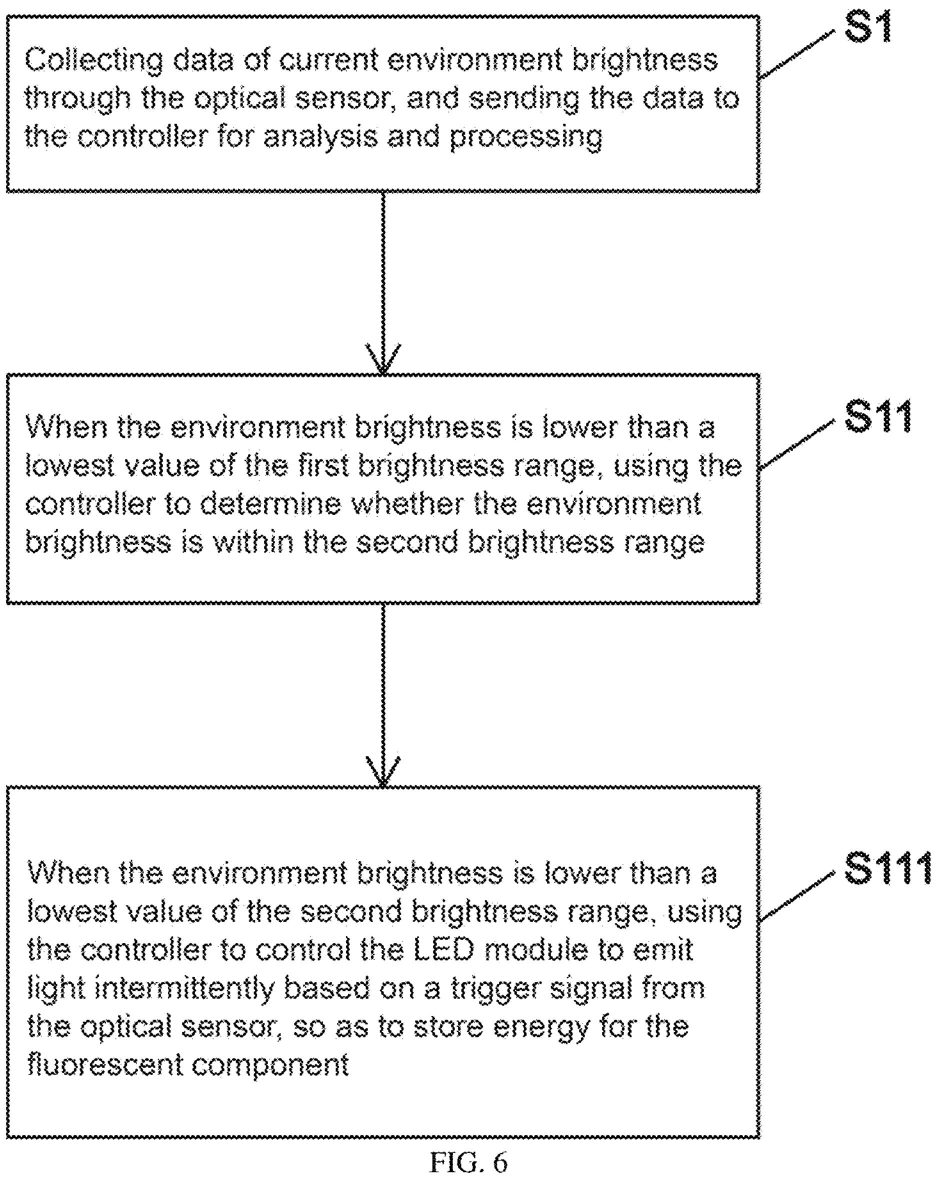
FIG. 6 is a schematic diagram of a light-emission adjustment method provided in the present disclosure.

Referring to FIG. 6, a second embodiment of the present disclosure provides a light-emission adjustment method adopting the cold light source light-emission apparatus 100 disclosed in the first embodiment or any of its implementations, including the following steps.

S1, collecting data of current environmental brightness through the optical sensor 150 and sending the data to a controller for analysis and processing.

A first brightness range, the second brightness range, and a limited brightness time period are preset in the controller, and a highest value of the second brightness range is not higher than a highest value of the first brightness range.

The first brightness range contains the second brightness range. The first brightness range and the second brightness range both can be set according to actual needs, for example, based on actual application scenarios of the cold light source light-emission apparatus 100.

S11, when environment brightness is lower than a lowest value of the first brightness range, the controller determines whether the environment brightness belongs to the second brightness range.

S111, when the environment brightness is lower than a lowest value of the second brightness range, the controller controls the LED module 130 to emit light intermittently based on a trigger signal from the optical sensor 150, so as to store energy for the fluorescent component 110.

When the environment light is insufficient, the fluorescent powder slowly releases its stored energy to light. Therefore, when the environment brightness is lower than the lowest value of the second brightness range, the light emitted by the fluorescent element 110 is obviously not enough to serve as a good reminder. At this point, the LED module 130 intermittently emits light, which can not only store energy for the fluorescent element 110, but also serve as a reminder, making it easy for users or others to locate a position of the cold light source light-emission apparatus 100.

In some embodiments, when determining whether the environment brightness belongs to the second brightness range, the present method further includes S112: when the environment brightness belongs to the second brightness range, the controller starts a timing module and continuously determines brightness in the limited brightness time period.

In some embodiments, the limited brightness time period is longer than one intermittent cycle of the LED module 130 emitting light intermittently. Therefore, it is possible to determine whether the cold light source light-emission apparatus 100 can stably light by observing changes in the environment brightness during the limited brightness time period.

S1121, when the environment brightness remains within the second brightness range during the entire limited brightness time period, the controller receives a hold signal from the optical sensor 150 and controls the LED module 130 to turn off.

At this point, the fluorescent powder absorbs enough energy to emit light with sufficient intensity in a time gap where the LED module 130 does not emit light, so that the environment brightness falls within the second brightness range during the limited brightness time period. Therefore, the LED module 130 can be turned off to reduce its energy consumption.

In some embodiments, when continuously determining the brightness during the limited brightness time period, the present method further includes S1122: during the limited brightness time period, when the environment brightness does not remain within the second brightness range, the controller adjusts the LED module 130 to continuously emit light intermittently.

At this point, the fluorescent powder does not absorb enough energy to light with brightness within the second brightness range, resulting in the environment brightness not being able to remain within the second brightness range during the limited brightness time period. The LED module 130 continues to emit light intermittently, thereby storing energy for the fluorescent powder in the fluorescent component 110 through the LED module 130. Therefore, at this point, the cold light source light-emission apparatus 100 mainly uses the LED module 130 to locate the cold light source light-emission apparatus 100 and to play a reminder role.

S113, when the environment brightness is higher than the highest value of the second brightness range, the LED module 130 is controlled to turn off. At this point, the natural light or the light emitted by the fluorescent component 110 meets users' requirements.

S12, when the collected environment brightness is higher than the highest value of the first brightness range, the controller determines that the light is sufficient, terminates a current operation of the cold light source light-emission apparatus 100, and does not proceed to next operations.

When the environment brightness is higher than the set first brightness range, the environment brightness is sufficient for users to see objects clearly, without a need to charge the fluorescent powder in the fluorescent component 110. The fluorescent powder directly absorbs environmental light for energy storage, which can improve energy utilization efficiency.

The light-emission adjustment method adopting the cold light source light-emission apparatus 100 in this embodiment can adopt the cold light source light-emission apparatus 100 to adjust light emission, so that the cold light source light-emission apparatus 100 can stably emit light in low environment brightness, thereby playing a role in locating and reminder through the cold light source light-emission apparatus 100. By setting the first brightness range, the second brightness range, and the limited brightness time period, the LED module 130 of the cold light source light-emission apparatus 100 can be further adjusted, which can make the fluorescent powder stably light under specific conditions, save energy consumption of the LED module 130, and extend service life of the LED module 130 and service life of the cold light source light-emission apparatus 100.

Figure 7:
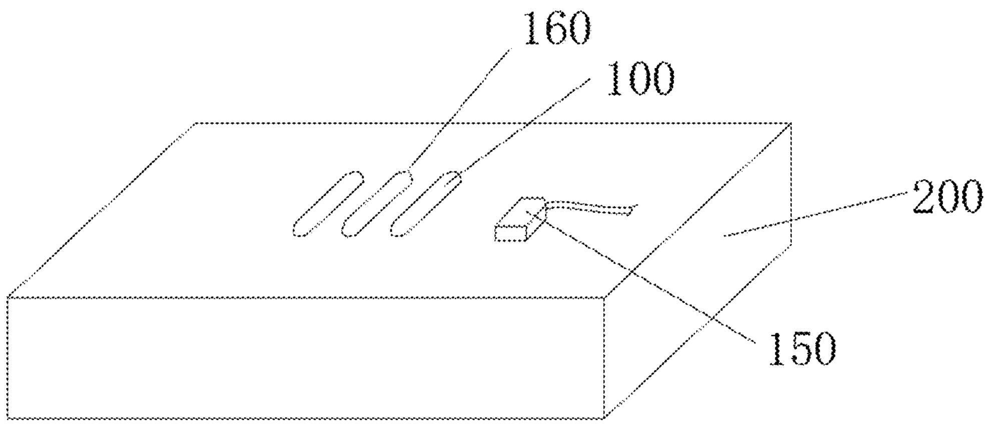
FIG. 7 is a schematic diagram of an outdoor light-emission device provided in the present disclosure.

Referring to FIG. 7, a third embodiment of the present disclosure provides an outdoor light-emission device, including an outdoor device body 200 and the cold light source light-emission apparatus 100 as described in the first embodiment or any of its implementations. The cold light source light-emission apparatus 100 is arranged at the outdoor device body 200.

In the outdoor light-emission device of this embodiment, the cold light source light-emission apparatus 100 is arranged at the outdoor device body 200. The outdoor device body 200 itself does not emit light or cannot emit light according to the environment brightness. Therefore, in a situation of low environment brightness, light-emission characteristics of the cold light source light-emission apparatus 100 can be used to locate and remind the outdoor light-emission device, making it convenient for users to find the outdoor device body 200 they need.

In some embodiments, the cold light source light-emission apparatus 100 is arranged inside the outdoor device body 200, and the outdoor device body 200 is provided with a slot 160 corresponding to the fluorescent component 110. The fluorescent component 110 of the cold light source light-emission apparatus 100 is opposite to the slot 160, and can emit light through the slot 160 for locating and reminder.

The cold light source light-emission apparatus 100 is arranged inside the outdoor device body 200. The fluorescent component 110 is opposite to the slot 160 and can light through the slot 160. Moreover, the outdoor device body 200 can protect the cold light source light-emission apparatus 100 from external damage. A plurality of slots 160 can be set with unlimited shape and size. The plurality of slots are mainly configured to transmit the light emitted from the cold light source light-emission apparatus 100, so as to achieve locating and reminder through the emitted light. A shape of a cross section of the slot 160 may be rectangle, square, ellipse, circle, star, etc.

The optical sensor 150 is arranged on a surface of the outdoor device body 200. Or a slotted hole corresponding to the optical sensor 150 is arranged on the outdoor device body 200, and the optical sensor 150 is arranged inside the outdoor device body 200 and is opposite to a central axis position of a light-emission direction of the fluorescent component 110 through the slotted hole, thereby facilitating the optical sensor 150 to sense light-emission intensity of the fluorescent component 110.

In summary, the present disclosure provides a cold light source light-emission apparatus, a light-emission adjustment method, and an outdoor light-emission device. The cold light source light-emission apparatus includes a fluorescent component and an LED module. When there is natural light, fluorescent powder can directly absorb the natural light for energy storage, and then the fluorescent powder can be excited to emit light, making it suitable for use at night. When the natural light is insufficient, the fluorescent component cannot absorb enough natural light, but the LED module can be turned on to emit light on the fluorescent component, thereby helping the fluorescent powder in the fluorescent component to store energy. Moreover, a fluorescent layer is arranged inside an accommodation cavity of a transparent body, which can protect the fluorescent layer from external damage and ensure uniform light emission. The light emitted by the fluorescent powder has no impact on human health, and the cold light source light-emission apparatus of the present disclosure can charge the fluorescent component through the LED module when the natural light is insufficient, thereby exciting the fluorescent powder to emit light, so that the fluorescent powder can store enough energy and emit light even in cloudy and insufficient-light weather conditions, having wide application scenarios.

It should be noted that the above embodiments are only used to illustrate the technical solutions of the present disclosure without any limitation. Although the present disclosure is described in detail with reference to the aforementioned embodiments, those skilled in the art should understand that they can still modify the technical solutions described in the aforementioned embodiments, or equivalently substitute some of the technical features, and all these modifications or substitutions do not deviate from the essence and scope of the technical solutions in the present disclosure.

What is claimed is:

1. A cold light source light-emission apparatus, arranged at an outdoor light-emission device, the cold light source light-emission apparatus comprising:

a fluorescent component comprising a transparent body and a fluorescent layer, wherein an interior of the transparent body is a pre-formed accommodation cavity, the fluorescent layer is arranged inside the accommodation cavity, and an interior of the fluorescent layer is arranged with fluorescent powder; and an LED module, wherein a light-emission direction of the LED module is set towards the fluorescent component;

wherein, when the LED module emits light towards the fluorescent component, the fluorescent powder absorbs the light for energy storage, and when the fluorescent powder absorbs sufficient light for energy storage, the fluorescent powder reaches an excited state and continuously and stably emits light; wherein the fluorescent powder is further configured to absorb natural light for energy storage, and the LED module is configured to emit light towards the fluorescent component to supplement energy storage of the fluorescent powder when the natural light is insufficient.

2. The cold light source light-emission apparatus according to claim 1, wherein the LED module comprises a plurality of LED chips comprising a UV chip.

3. An outdoor light-emission device, comprising an outdoor device body and the cold light source light-emission apparatus according to claim 2, wherein the cold light source light-emission apparatus is arranged at the outdoor device body.

4. The outdoor light-emission device according to claim 3, wherein the cold light source light-emission apparatus is arranged inside the outdoor device body, and the outdoor device body is arranged with a slot corresponding to the fluorescent component.

5. The cold light source light-emission apparatus according to claim 1, wherein a surface of the fluorescent layer is arranged with a plurality of protrusions, and cross-sectional widths of the plurality of protrusions decrease along a direction deviating from the fluorescent layer.

6. The cold light source light-emission apparatus according to claim 5, wherein a plurality of transparent protrusions are arranged between the transparent body and a bottom of the fluorescent layer, and the fluorescent powder is arranged between adjacent transparent protrusions.

7. The cold light source light-emission apparatus according to claim 6, wherein a filter is arranged between the LED module and the fluorescent component, and a bottom of the LED module is arranged with a base.

8. The cold light source light-emission apparatus according to claim 1, wherein the cold light source light-emission apparatus further comprises an optical sensor and a controller both electrically connected to each other, the optical sensor is arranged at the outdoor light-emission device, and the controller is electrically connected to the LED module;

wherein, when the optical sensor senses environment brightness and then sends a signal, the controller receives the signal to obtain data of the environment brightness;

when the environment brightness is lower than a second brightness range, the controller adjusts the LED module to intermittently emit light to store energy for the fluorescent component; and when the environment brightness is within the second brightness range, the controller adjusts the LED module to turn off.

9. A light-emission adjustment method adopting the cold light source light-emission apparatus according to claim 8, the method comprising steps of:

collecting data of current environment brightness through the optical sensor, and sending the data to the controller for analysis and processing;

presetting a first brightness range, the second brightness range, and a limited brightness time period in the controller, wherein a highest value of the second brightness range is not higher than a highest value of the first brightness range;

when the environment brightness is lower than a lowest value of the first brightness range, using the controller to determine whether the environment brightness is within the second brightness range; and when the environment brightness is lower than a lowest value of the second brightness range, using the controller to control the LED module to emit light intermittently based on a trigger signal from the optical sensor, so as to store energy for the fluorescent component.

10. The light-emission adjustment method according to claim 9, wherein the step of using the controller to determine whether the environment brightness is within the second brightness range further comprises steps of:

when the environment brightness is within the second brightness range, using the controller to start a timing module and continuously determine brightness during the limited brightness time period; and, when the environment brightness remains within the second brightness range during the entire limited brightness time period, using the controller to receive a hold signal from the optical sensor and control the LED module to turn off.

* * * * *